UNITED STATES PATENT OFFICE.

EMILE BINDSCHEDLER, OF PHILADELPHIA, PENNSYLVANIA.

PROCESS FOR THE RECOVERY OF VOLATILE SOLVENTS.

1,368,601. Specification of Letters Patent. Patented Feb. 15, 1921.

No Drawing. Application filed July 28, 1920. Serial No. 399,620.

*To all whom it may concern:*

Be it known that I, EMILE BINDSCHEDLER, a citizen of the Republic of Switzerland, residing in the city and county of Philadelphia, in the State of Pennsylvania, have invented a certain new and useful Improvement in Processes for the Recovery of Volatile Solvents, of which the following is a true and exact description.

The object of my invention is the economical recovery of volatile solvents from gaseous mixtures such as are formed in many industries, such as the manufacture of smokeless powder, artificial silk made by the nitrocellulose process and the like. In my application for Letters Patent filed June 18, 1920, Serial Number 389,847, I have described an improved process for the recovery of such solvents in which the gaseous mixture is first passed into intimate contact with phenols, preferably cresol, to extract from the gaseous mixture the greater part of the solvents and the gas containing the remaining solvents and some phenols is then brought into intimate contact with concentrated sulfuric acid to extract the solvents and phenols which can be recovered from their combination with the acid in well known ways. My present invention is in the nature of an improvement on this process and consists in passing the mixture of solvent vapors and gas as before into intimate contact with phenols to extract the greater part of the solvents, then passing the gas with the remaining solvents and cresol vapors into intimate contact with an alkaline solution, preferably caustic soda lye, which will combine with and extract the phenols and then passing the gas and solvent vapors into intimate contact with concentrated sulfuric acid to extract the solvents.

As carbonic acid in the air would in contact with the alkaline solution form carbonates in which the phenols are not soluble, it is advisable to remove the carbonic acid from the air before the mixed air and vapors are brought in contact with the alkaline solution and this can be done by passing the air through a tower or chamber filled with quicklime to absorb the carbonic acid. By preference this treatment should precede the passing of the air and vapors into contact with the phenols.

The solvents are extracted from their combination with the acid by diluting the acid and heating it to drive off the solvents and the combination formed by the phenols and alkali is broken up by treating the solution with acid and for this purpose the dilute acid from which the solvents have been removed can economically be used and the cost of reconcentration saved to the extent of such use. The reaction occurring in this recovery of phenols may be expressed as follows:

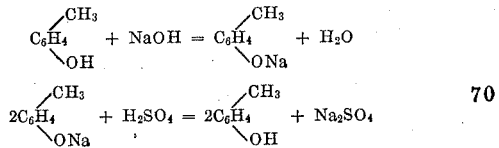

Having now described my invention, what I claim as new and desire to secure by Letters Patent, is:

1. The method of recovering volatile solvents from gaseous mixtures containing such solvents which consists in bringing such mixtures into intimate contact with phenols to bring about the absorption of the greater part of the contained solvent, subsequently bringing the gases from the phenol absorption system into intimate contact with an alkaline solution to remove from them any phenols carried with them, subsequently bringing the gases into intimate contact with concentrated sulfuric acid to bring about the absorption of such solvent as may remain unabsorbed by the phenols and recovering the solvents and phenols from the absorbents used.

2. The method of recovering volatile solvents from gaseous mixtures containing such solvents which consists in bringing such mixtures into intimate contact with phenols to bring about the absorption of the greater part of the contained solvent, extracting carbonic acid from the mixture of air and vapors, subsequently bringing the gases from the phenol absorption system into intimate contact with an alkaline solution to remove from them any phenols carried with them, subsequently bringing the gases into intimate contact with concentrated sulfuric acid to bring about the absorption of such solvent as may remain unabsorbed by the phenols and recovering the solvents and phenols from the absorbents used.

3. The method of recovering volatile solvents from gaseous mixtures containing such solvents which consists in bringing such mixtures into intimate contact with phenols to bring about the absorption of the greater part of the contained solvent, subsequently bringing the gases from the phenol absorption system into intimate contact with an alkaline solution to remove from them any phenols carried with them, subsequently bringing the gases into intimate contact with concentrated sulfuric acid to bring about the absorption of such solvent as may remain unabsorbed by the phenols, diluting and heating the acid to drive off the solvents, and treating the solution formed by the phenols in combination with the alkaline solution with the dilute acid to free the phenols from the alkali.

EMILE BINDSCHEDLER.